Oct. 20, 1953        P. S. GOODWIN        2,656,498
ELECTROMETER AMPLIFIER NETWORK
Filed March 19, 1949                     3 Sheets-Sheet 1

INVENTOR.
PAUL S. GOODWIN
BY
*James B. Christie*
ATTORNEY

Oct. 20, 1953     P. S. GOODWIN     2,656,498
ELECTROMETER AMPLIFIER NETWORK
Filed March 19, 1949     3 Sheets-Sheet 3
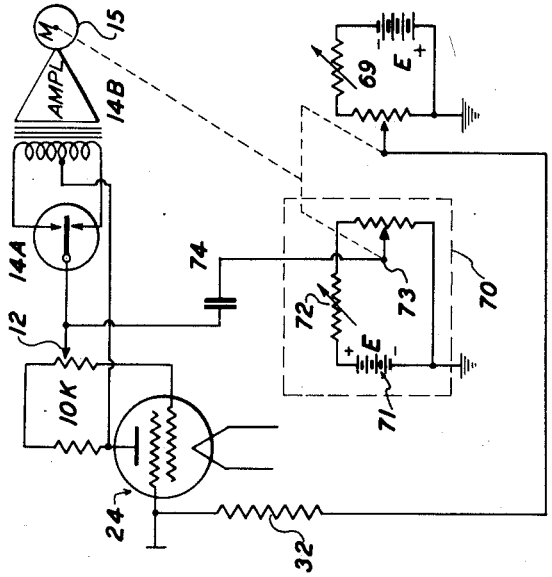
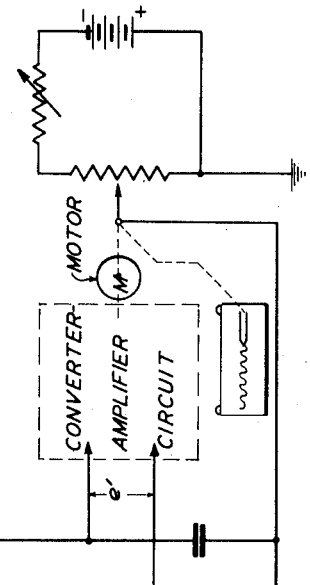
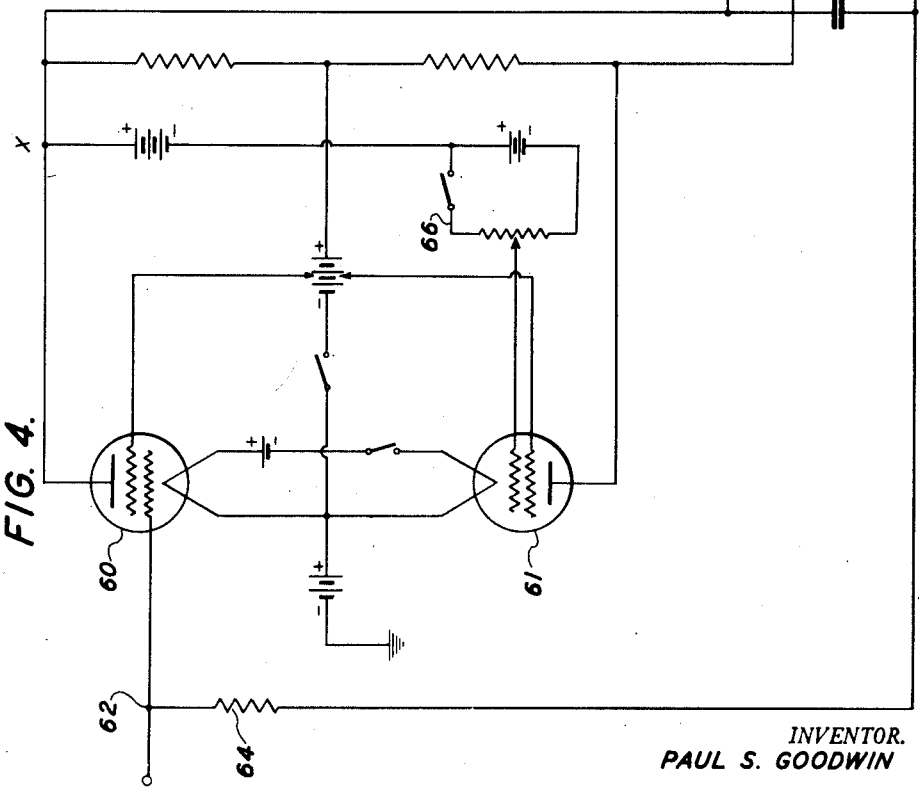
INVENTOR.
PAUL S. GOODWIN
BY
*James B. Christie*
ATTORNEY Patented Oct. 20, 1953

2,656,498

UNITED STATES PATENT OFFICE 2,656,498

ELECTROMETER AMPLIFIER NETWORK

Paul S. Goodwin, Pasadena, Calif., assignor to Consolidated Engineering Corporation, Pasadena, Calif., a corporation of California Application March 19, 1949, Serial No. 82,337

15 Claims. (Cl. 318—28)

This invention relates to an amplifier recorder for the measurement of minute electrical currents of the order of magnitude of approximately $10^{-9}$ amperes to $10^{-15}$ amperes. The measurement of such small currents is necessary in the practice of mass spectrometry to measure the current received by the ion collector, in the operation of radiation detectors and in many other fields.

Most commercially available recorders do not lend themselves readily to the recording of minute currents of the order of $10^{-8}$ amperes or less because of their relatively low input impedance. Several circuits have been developed and described in the literature which combine high impedance D. C. amplifiers or A. C. electrometers with such low impedance recorders, but these circuits are generally quite complex and hence, very expensive to construct. I have now developed an extremely simple circuit which may incorporate a commercial amplifier recorder for the measurement of these small currents and the performance of which compares very favorably with more complicated arrangements.

Throughout the specification and claims, the term "D. C. amplifier" is used to designate a resistance coupled vacuum tube amplifier and the term "A. C. amplifier" is used to designate a reactance coupled vacuum tube amplifier.

In accordance with the invention, I provide a pre-amplifier network feeding a recorder amplifier, either of the type available commercially or specially constructed for the purpose, and a range multiplying system by means of which the sensitivity of the recorder may be altered in accordance with the magnitude of the received signal. The range multiplying network may be controlled manually or automatically as desired.

A feature of the invention is the incorporation of a unique and extremly sensitive balancing network to balance the output of the pre-amplifier when there is no input signal. In one embodiment, the balancing network comprises a series of resistors connected between the plate supply voltage terminal and the space charge grid of the pre-amplifier tube. A selector switch having a number of positions corresponding to the number of resistors in the aforementioned series is coupled to a helical potentiometer and permits the "zero" condition to be bracketed by connecting the potentiometer across appropriate series resistors. The potentiometer may then be adjusted to a voltage exactly equal to the voltage appearing at the plate of the pre-amplifier tube. In this manner the potential at the output terminals of the pre-amplifier may be adjusted to zero when there is no input signal.

In addition to providing a very sensitive balancing means, the balancing network of the invention results in a very great improvement in drift stability by reason of the fact that the balancing voltage is taken from the space charge grid rather than from an independent potential source.

The output of the pre-amplifier feeds a D. C. to A. C. converter, the latter in turn feeds an A. C. amplifier. The entire system is a null network, i. e. the output of the A. C. amplifier drives a motor which in turn varies the setting of a slide wire potentiometer to feed a balancing voltage into the input of the pre-amplifier. A recording pen is mechanically linked to the motor driven slider of the potentiometer to record the excursions of the slider and thus the relative magnitude of the input signal. Another feature of the invention is a range multiplying network wherein the voltage impressed across the slide wire potentiometer may be varied in accordance with the magnitude of the input signal. In this manner, maximum sensitivity of the potentiometer to relative changes in the input signal may be achieved by varying the full scale voltage of the potentiometer.

Other novel features of the circuit of the invention, will become apparent from the following detailed description of the improved amplifier recorder network as taken in conjunction with the accompanying drawing in which:

Fig. 4 is a simplified circuit diagram showing an alternative type of pre-amplifier; and Fig. 5 is a circuit diagram showing an alternative type of damping network.

Figure 1:
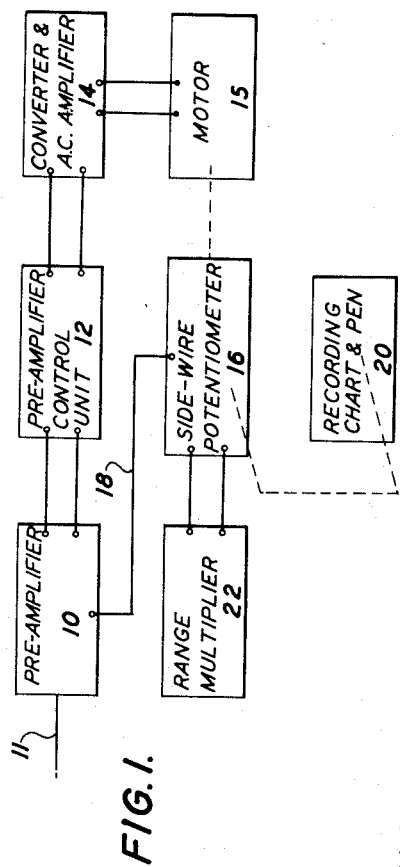
Fig. 1 is a block diagram of the network.

In the block diagram of Fig. 1, the apparatus of the invention is illustrated as including a pre-amplifier 10 which receives an input signal through lead 11. The pre-amplifier is coupled to a pre-amplifier control unit 12 by means of which the pre-amplifier is balanced to zero output when there is no input signal at 11. The pre-amplifier control unit is in turn coupled to a combination converter and A. C. amplifier 14, the output of which is fed to a motor 15. The motor is mechanically coupled to a slide wire potentiometer 16 and is actuated by the A. C. amplifier output in phase with the converter to adjust the slider of the potentiometer to a point where a balancing voltage is impressed on a lead 18 connecting the slide wire potentiometer and pre-amplifier. A recording mechanism 20 includes a pen (not shown) mechanically linked to the slider of potentiometer 16 to record on a chart (not shown) the movement of the slider. A range multiplier network 22 is connected across potentiometer 16 and permits range adjustment as hereinafter described.

Figure 2:
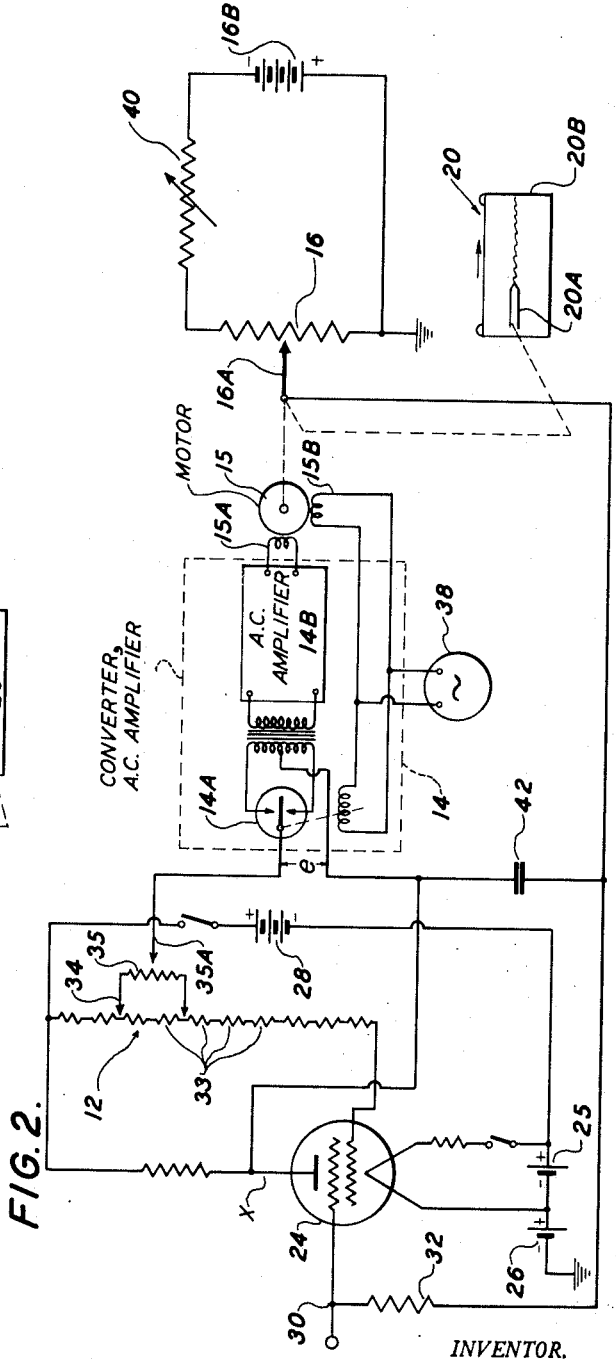
Fig. 2 is a simplified circuit diagram of the system shown in Fig. 1.

In Fig. 2 one embodiment of the invention is illustrated by means of a simplified circuit diagram. Referring to Fig. 2 the pre-amplifier includes a vacuum tube 24 connected in what is known in the art as a space-charge grid connection. The tube 24 is supplied by a filament voltage source 25 in conjunction with a bias battery 26. Plate voltage and space-charge grid voltage are supplied by a battery 28. A signal to be measured is received through lead 30 developing a voltage as it flows through an input grid leak resistor 32 of comparatively high impedance, say on the order of 30,000 megohms. This voltage causes the control grid of tube 24 which, in this particular network, is the second grid from the filament to swing slightly positive. This positive grid voltage will increase the plate current causing the plate voltage to become more negative.

The quiescent value of the plate voltage at point X when there is no input signal at 30 is balanced against the voltage appearing in the pre-amplifier control unit 12 which functions as a zero set network. The particular balancing network 12 is a unique arrangement allowing very sensitive control of the zero position. It consists of a series of resistors 33 connected between the space-charge grid and the plate voltage supply 28 of tube 24, and selector switch 34. The selector switch 34 is coupled to a helical potentiometer 35 which is connected in the circuit across appropriate ones of resistors 33 by means of the selector switch. Once the zero position has been bracketed by means of the selector switch, the arm 35A of the helical potentiometer may be very readily adjusted to the proper null position. This null is a balance between the arm 35A of the helical potentiometer and the point X, i. e. the plate circuit of tube 24. This balance causes zero voltage to appear across the point $e$ when no signal appears at 30. In this manner the reference level zero line of the record is established. As mentioned above, a feature of this balancing network is that the balancing voltage is obtained from the space-charge grid with a consequent high degree of drift stability.

Any variations in the quiescent state of the plate circuit at X caused by a signal current flowing through resistor 32 will create a potential difference at $e$ which will be a function of the magnitude of the current through resistor 32. Since the pre-amplifier is a D. C. amplifier, the potential at $e$ developed responsive to the input signal at 30 is a D. C. potential.

The potential at $e$ is impressed on the converter and A. C. amplifier 14 which includes a chopper or vibrator 14A. The chopper 14A converts the D. C. voltage appearing at $e$ into an A. C. variation which is impressed on an A. C. amplifier 14B. The output of the A. C. amplifier is fed to one coil 15A of the two coil motor 15. The chopper 14A is energized from an A. C. source 38 which is conveniently the A. C. power line frequency. The chopper of course, may be peaked at any arbitrary carrier frequency but the availability of 50/60 cycle A. C. power makes its use convenient.

As mentioned above, the amplifier drives one coil 15A of the two coil motor 15, the other coil 15B of the motor being excited by the carrier frequency, in this case the source 38. Since the coils 15A, 15B of the motor are in quadrature, only those impulses impressed on coil 15A which are 90° out of phase with the impulses impressed on coil 15B will cause the motor to rotate. Any other phase or any source of extraneous hum appearing as a component on coil 15A will not cause rotation of the motor. Hence, there exists at the output a shaft rotation of the motor 15 which is proportional only to the D. C. voltage appearing across the grid leak resistor 32 of the pre-amplifier.

As mentioned above, the unit 14 and the motor 15 may be obtained commercially as a unit which, although not necessary, is at least an expedient practice for reasons of economy. There is nothing critical about the design of the A. C. amplifier 14B except that it should have a sufficient gain. The amplifier does not have to be a band pass or peaked amplifier. Preferably, the amplifier 14B has a variable gain control compensatory to the adjustment of the full scale sensitivity of the slide wire potentiometer. The reason for this will be described in greater detail hereinafter.

The motor 15 is mechanically linked to the arm 16A of the slide wire potentiometer 16. Any type of potentiometer may be employed at this point but a slide wire potentiometer is convenient in this application. The resistance card of the potentiometer has a voltage impressed across it from a D. C. voltage source 16B. The voltage is zero at one end of the card known as zero reference line and is maximum negative at what is known as the full scale reference line. The reason that this card is negative at full scale is that the voltage appearing between the arm 16A of the zero reference point, i. e. ground connection, must be equal and opposite to the voltage developed by the signal current flowing through the grid leak resistor 32. When negative signals are to be received by the pre-amplifier the polarity of 16B should be reversed from that just described.

The voltage that is impressed across the slide wire resistor card determines the full scale sensitivity of the recorded signal. I have provided a network which permits variation of the full scale voltage across the potentiometer which, coupled with any convenient switching mechanism, will permit this voltage to be changed in accordance with pre-determined selected positions, hence permitting a change in the full scale range of the recorder. This network includes a potentiometer coil 16, D. C. source 16B and a variable resistance 40. The D. C. source 16B may be such as to allow upwards of 30 volts to be impressed across the potentiometer. Variations in the setting of the resistor 40 will permit changes in the full scale voltage of the potentiometer between a minimum value and the maximum determined by the voltage source 16B.

The system is a null balance network with the input voltage being equal and opposite to the output voltage within predetermined errors. The arm of the slide wire potentiometer 16 in the output circuit is linked mechanically to the recording mechanism 20 including a pen 20A and a chart 20B contacted by the pen.

In this manner the movement of the arm 16A is recorded on the chart as a function of time. The network is a loop system in that the voltage between the arm 16A and the ground is electrically connected back to the potentiometer end of the grid leak resistor 32. Any disturbance such as a signal current flowing through resistor 32 is amplified throughout the system causing the motor 15 to move the slide wire of potentiometer 16 so as to bring the voltage of the control grid of tube 24 back to ground potential, this being the reference potential of the system.

The drive motor 15 will not move until a voltage sufficient to overcome friction appears across winding 15A. This voltage divided by the gain at the A. C. and D. C. amplifier combination represents a possible error in the system. The gain of the A. C. amplifier must be sufficient to reduce this error to a negligible quantity.

Since this is a closed loop system, it, like any servomechanism or feedback system is subject to oscillation or underdamping unless means are provided to overcome such tendency. This tendency is especially apparent when the system includes a transducer for converting electrical to mechanical energy. The mass of moving elements like the arm of potentiometer 16 and the pen increase the inertia, requiring force to overcome the inertia of these members. To damp the system there must be fed into the circuit in some convenient manner a voltage proportional to either the slide wire velocity or acceleration and of such polarity that as the velocity tends to decrease the damping voltage will create a dynamic braking system.

This damping is acomplished in one embodiment of the invention as shown in Fig. 2 by means of condenser 42. Actually several different types of damping networks have been used satisfactorily, however, the condenser, is one of the simplest of these. A novel application of the damping condenser is a feature of the invention. It would be conventional practice to place the condenser so that it fed the derivative voltage, i. e. the velocity or acceleration component of the potentiometer arm into the input of the loop; for example, into the control grid of tube 24 or somewhere in the neighborhood of resistance 32. This type of connection is difficult if not impossible in the present system because of the very high impedance level involved in that part of the circuit, the need for eliminating leakage currents, and also because of the short time constant or fast response desired of the system. In this instance the condenser 42 has been connected to feed a damping voltage into the chopper mechanism 14A by being placed between the slide wire arm 16A and the plate of the pre-amplifier tube 24. This placement of the damping condenser 42 has two advantages. It avoids the high impedance portions of the input circuit and also injects the derivative voltage into a little higher gain portion of the circuit, when space-charge grid connected pre-amplifiers are employed.

Another type of damping network is illustrated in the circuit diagram of Fig. 5. The circuit there shown includes the pre-amplifier tube 24, grid leak resistor 32, balancing network 12 (with the details omitted) chopper 14A amplifier 14B, motor 15 and range multiplying network 69. In addition, there is included a second network identical to the network 16 and comprising a potentiometer circuit 70. In this second network the voltage across potentiometer 70 is of opposite polarity to that across potentiometer 69. Slider 73 of potentiometer 70 is connected to one terminal of chopper 14A through condenser 74. This damping network has the advantage over the damping means of Fig. 2 in that it does not load down the plate (signal) circuit of the pre-amplifier. The condenser 42 (Fig. 2) being of relatively large capacity has some tedency of interfere with the transient response of the pre-amplifier. The damping network shown in Fig. 5 has no such tendency, as little if any signal appears in the space-charge grid circuit.

Figure 3:
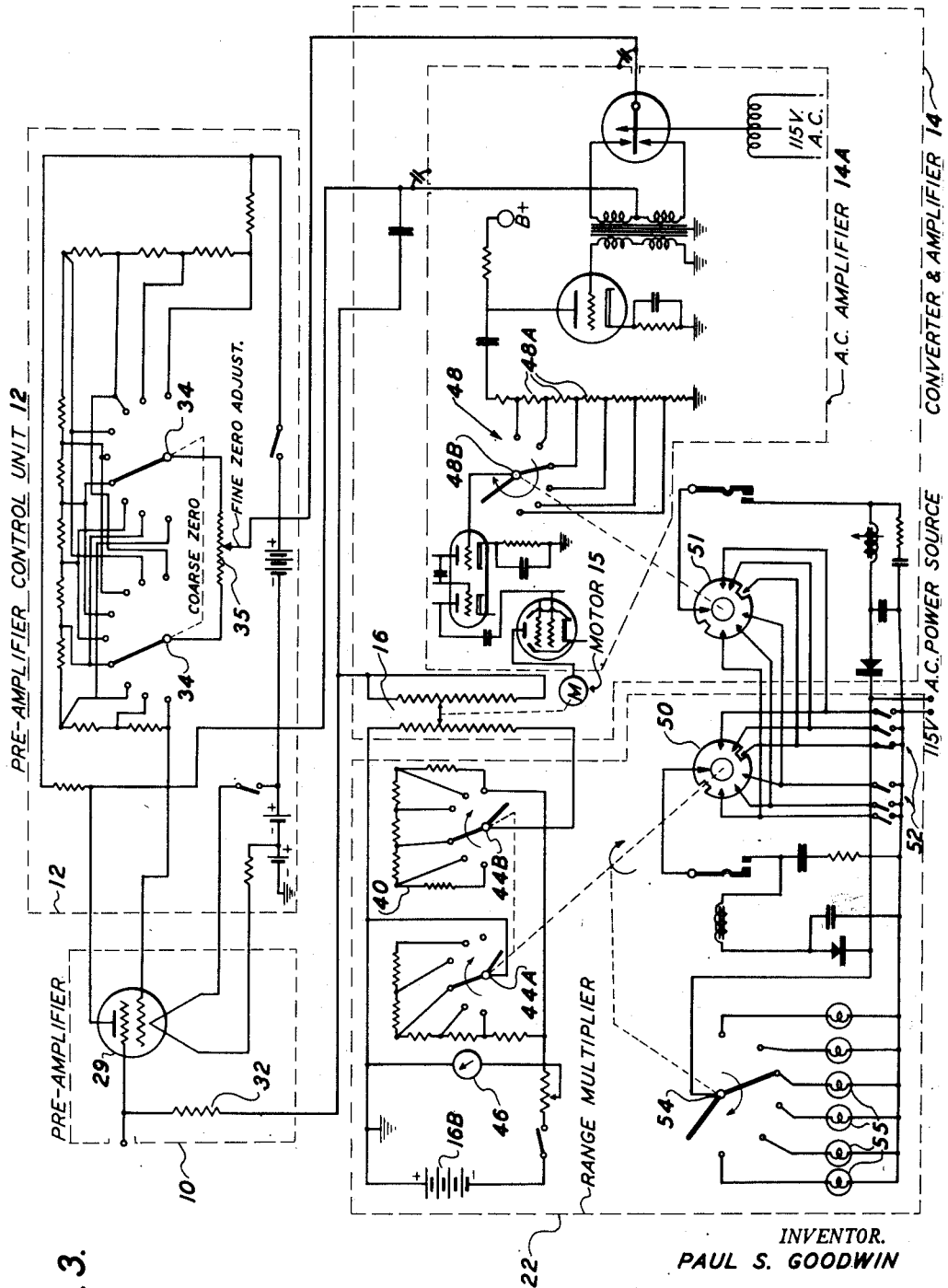
Fig. 3 is a detailed circuit diagram of an operable unit in accordance with the invention.

The system shown in Fig. 2 is illustrated in greater detail in Fig. 3. In essence the circuit of Fig. 3 is identical to that of Fig. 2 with the exception of the inclusion of switching means for simultaneously varying the gain of amplifier 14A with any change in the sensitivity of the recorded output. The circuit of Fig. 3 includes the pre-amplifier 10, the pre-amplifier control unit 12 showing more clearly the arrangement of series resistors, selector switch 34 and associated potentiometer 35, the converter and amplifier 14, the motor 15, slide wire potentiometer 16, and range multipler 22. Corresponding elements in the circuit of Fig. 3 are identified with the same reference characters employed in Fig. 2.

The range multiplier, comprising the D. C. source 16B connected across potentiometer 16 and a variable resistance network 40, is controlled by means of selector switch 44B. A companion selector switch 44A controls a series of shunt resistors which insure a constant drain on the source 16B as evidenced by the reading of meter 46. Amplifier 14A is provided with a variable gain control network 48 including a series of resistances 48A and the selector switch 48B. The switches 44A and 44B and the switch 48B in the amplifier are operated by the synchronized homing switches 50, 51. The homing switches 50, 51 are controlled by a plurality of throw switches 52, which may be either manually or automatically controlled. In some applications, for example mass spectrometry, the mass spectrometer output may be automatically attenuated. In such case, the attenuation circuit may be coupled to the switch bank 52 to automatically attenuate the present system. An indicator switch 54 may be ganged to the homing switch 50 to provide indication by lights 55 of the particular setting of the range multiplier and amplifier gain switches. Where the operation of the switch bank 52 is manually accomplished the indicator switch 54 serves no particular purpose. However, if the switch bank 52 is controlled automatically by an associated attenuating circuit it is very convenient to provide the indicating mechanism 54 as described, or to drive an auxiliary "marking circuit" to write or print the information on the recording chart.

The pre-amplifier described with relation to Figs. 2 and 3 is not the only type of pre-amplifier that will work in the null balancing system of the invention. The requirements are the same regardless of what type of pre-amplifier tube is used and any tube which will fulfill these requirements is satisfactory. Thus, the pre-amplifier tube must operate at a high grid resistance in the neighborhood of a thousand to ten million megohms since it is necessary to obtain a high impedance transformation ratio between the input and the terminals of chopper 14A, the latter being a low impedance device adapted to receive at most 10,000 ohms input impedance. The pre-amplifier tube must have a low grid current flow and must be stable with respect to drift resulting from such factors as age, supply voltage, and temperature variations. The pre-amplifier tube may have a grain that is less than, greater than, or equal to unity and the signal in the plate circuit will generally be at opposite polarity to the signal in the grid circuit. This latter condition is fulfilled in the circuit described with relation to Fig. 2 by the space-grid charge connection of tube 24. In the alternative, if the pre-amplifier tube is connected so that the signal at the output eelctrode is of the same polarity as that in the grid circuit, the wires feeding the coverter (point e) must be reversed so that the relationship between input and output voltages is preserved. In general, any vacuum tube designed as an electrometer tube and certain standard tubes capable of operation under these conditions, are satisfactory pre-amplifier tubes.

An alternative pre-amplifier circuit is shown in the circuit diagram of Fig. 4 and includes two tubes 60, 61 connected in push-pull arrangement with the control grid being next to the filament. The input signal appearing at lead 62 develops a voltage across a grid leak resistor 64 which is impressed on the control grid of the tube 60. The control grid of tube 61 is connected to a potentiometer 66 whereby the quiescent plate current of tube 60 at the point X is balanced against the plate current of tube 61 when no input signal appears across the grid leak resistor 64. In this manner a zero potential appears at e' when there is no input signal. The remainder of the circuit is identical to that described with relation to Figs. 2 and 3.

As the voltage appearing at the slider 16A of the potentiometer 16 is varied to change the sensitivity range of the potentiometer, the feedback signals involved become greater for increasing full scale voltage on the potentiometer. A point can be reached where the incremental voltage between adjacent turns of the slide wire resistance is sufficient to put a saturating signal into the A. C. amplifier thereby causing the system to hunt continuously. An adjustment of the gain control will stabilize this system by reducing the saturation of the amplifier.

If the voltage across the slidewire resistance card is increased, it becomes necessary to decrease the gain of the A. C. amplifier. This is not detrimental to the functioning of the system since the only reason for increasing the voltage across the slide wire is to accommodate an increase in the magnitude of the input signal. In this application an increase in the input signal makes possible a reduction in the gain of the amplifier without sacrificing any accuracy. Since there is an optimum adjustment for each voltage range, it is desirable, as shown in Fig. 3, to put a selector switch with fixed gain settings in the amplifier and to synchronize this switch with the attenuator switch that changes the voltage across the slide wire card. In this manner the slidewire card voltage and the amplifier gain are correspondingly adjusted simultaneously. A further refinement embodies the application of an existing attenuation circuit to automatically adjust the gain control and resistance card switches.

These and other modifications of the apparatus may occur to those skilled in the art without departing from the scope of the invention as herein defined.

I claim:

1. In a circuit for measurement of small currents, the combination comprising a D. C. amplifier with a relatively high input impedance and low output impedance and having a space-charge grid connection, control means for balancing a voltage obtained from the space-charge grid circuit against the output plate voltage to balance the output of the D. C. amplifier to zero level when there is no input signal, a converter for converting the output of the D. C. amplifier to an A. C. variation thereof, an A. C. amplifier for amplifying the output of the converter, a motor connected to be actuated by the output of the A. C. amplifier and, a potentiometer adjustable by said motor and connected to the D. C. amplifier to produce a null system.

2. In a circuit for the measurement of small currents, the combination comprising a D. C. amplifier with a relatively high input impedance and low output impedance and having a space-charge grid connection, control means for balancing a voltage obtained from the space-charge grid circuit against the output plate voltage to balance the output of the D. C. amplifier to zero level when there is no input signal, a converter for converting the output of the D. C. amplifier to an A. C. variation thereof, an A. C. amplifier for amplifying the output of the converter, a motor connected to be actuated by that portion of the output of the A. C. amplifier which is in phase with the converter, and a potentiometer adjustable by said motor and connected to the D. C. amplifier to produce a null system, so that the adjustment of the potentiometer provides a measure of the magnitude of the signal at the input circuit of the D. C. amplifier.

3. In a rebalancing control circuit, the combination comprising a D. C. amplifier with a relatively high input impedance and low output impedance, control means for balancing the output of the D. C. amplifier to zero level when there is no input signal, a converter for converting the output of the D. C. amplifier to an A. C. variation thereof, an A. C. amplifier for amplifying the output of the converter, a motor connected to be actuated by that portion of output of the A. C. amplifier which is in phase with the converter, a potentiometer having an output adjustable by said motor and connected to the D. C. amplifier to produce a null system, means for varying the voltage range of said potentiometer, and damping means for damping the oscillations of the system and including means for feeding a damping voltage to the output of the D. C. amplifier.

4. Apparatus according to claim 3 wherein the control means comprises a plurality of series arranged resistors connected between a grid of a tube in said D. C. amplifier and the plate supply voltage in said D. C. amplifier, a selector switch by means of which a balancing potentiometer may be connected across any of said resistors, the balancing potentiometer being adjustable to a voltage equal to the output voltage of said D. C. amplifier with zero signal input.

5. Apparatus according to claim 4 wherein said potentiometer is a helical potentiometer.

6. Apparatus according to claim 3 wherein said damping means comprises a condenser connected between said slider of said potentiometer and the output of said D. C. amplifier.

7. Apparatus according to claim 3 wherein said damping means comprises a second potentiometer having a slider adjustable by said motor simultaneously with the slider of said first mentioned potentiometer, the slider of said second potentiometer being electrically connected through a condenser to the output of said D. C. amplifier.

8. In an amplifier for the measurement of small currents, the combination comprising a pre-amplifier with a relatively high input impedance and low output impedance, control means for balancing the output of the pre-amplifier to zero level when there is no input signal, a converter connected to said pre-amplifier to convert the output thereof to an A. C. variation, an A. C. amplifier for amplifying the output of the converter, a motor actuated by the output of the A. C. amplifier, a first potentiometer having a resistance card connected across a first voltage source with a first variable resistance connected between the source and the resistance card and a slider electrically connected to the input of said pre-amplifier, a second potentiometer having a resistance card connected across a second voltage source with a second variable resistance connected between the source and the resistance card, and a slider mechanically connected to said motor and electrically connected to the output of the pre-amplifier.

9. In a circuit for the measurement of small currents, the combination comprising a D. C. amplifier with a relatively high input impedance and low output impedance and having a space-charge grid connection, and including a tube having a filament, anode, control grid and space charge grid, control means for balancing a voltage obtained from the space-charge grid circuit against the output plate voltage to balance the output of the D. C. amplifier to zero level when there is no input signal, a converter for converting the output of the D. C. amplifier to an A. C. variation thereof, an A. C. amplifier for amplifying the output of the converter, a motor connected to be actuated by the A. C. amplifier and, a potentiometer having a slider adjustable by said motor and electrically connected to the input of said D. C. amplifier, so that the adjustment of the potentiometer varies with the magnitude of the signal at the input circuit of the D. C. amplifier.

10. Apparatus according to claim 9 wherein the control means comprises a plurality of series connected resistors connected between the space-charge grid and plate supply voltage of said tube, a potentiometer having a resistance card and a slider, a selector switch for connecting the resistance card of the potentiometer across selected ones of said series resistors, said slider being electrically connected to said converter.

11. Apparatus according to claim 10 wherein said potentiometer is a helical potentiometer.

12. In a rebalancing control circuit, the combination comprising a D. C. amplifier with a relatively high input impedance and a low output impedance, control means for balancing the output of the D. C. amplifier to zero level when there is no input signal, a converter for converting the output of the D. C. amplifier to an A. C. variation thereof, a variable gain A. C. amplifier for amplifying the output of the converter, a motor connected to be actuated by that portion of the output of the A. C. amplifier which is in phase with the converter, a potentiometer having an output adjustable by said motor, means electrically connecting the slider of said potentiometer to said D. C. amplifier to produce a null system, a voltage source and a variable resistance connected serially to said potentiometer by means of which the sensitivity of the potentiometer may be varied, means for simultaneously and inversely varying the gain of said amplifier with any variation in the sensitivity of said potentiometer, and damping means for damping the oscillation of the system and including means for adding a damping voltage to the output of the D. C. amplifier.

13. In a circuit for the measurement of small currents, the combination comprising a D. C. amplifier including a tube having a filament, anode, control grid, and space-charge grid, a grid leak resistance connected to the control grid and having a resistance in the range of about $3 \times 10^4$ to $10^7$ megohms, control means for balancing a voltage obtained from the space-charge grid circuit against the output plate voltage to balance the output of the amplifier to zero level when there is no input signal, a converter for converting the output of the D. C. amplifier to an A. C. variation thereof, an A. C. amplifier for amplifying the output of the converter, a motor connected to be actuated by the A. C. amplifier, and a potentiometer having a slider adjustable by said motor and electrically connected to the input of said D. C. amplifier, so that the adjustment of the potentiometer provides a measure of the magnitude of the signal at the input circuit of the D. C. amplifier.

14. In a circuit for the measurement of small currents, the combination comprising a D. C. amplifier including a tube having a filament, anode, control grid, and space-charge grid, a grid leak resistance connected to the control grid and having a resistance in the range of about $3 \times 10^4$ to $10^7$ megohms, control means for balancing a voltage obtained from the space-charge grid circuit against the output plate voltage to balance the output of the amplifier to zero level when there is no input signal, a converter having an input impedance of not more than $2 \times 10^4$ ohms for converting the output of the D. C. amplifier to an A. C. variation thereof, an A. C. amplifier for amplifying the output of the converter, a motor connected to be actuated by the A. C. amplifier, and a potentiometer having a slider adjustable by said motor and electrically connected to the input of said D. C. amplifier, so that the adjustment of the potentiometer provides a measure of the magnitude of the signal at the input circuit of the D. C. amplifier.

15. In a rebalancing control circuit, the combination comprising a D. C. amplifier with a relatively high input impedance and low output impedance and having a space-charge grid connection, control means for balancing a voltage obtained from the space-charge grid circuit against the output plate voltage of the amplifier to balance the output of the amplifier to zero level when there is no input signal, a converter for converting the output of the D. C. amplifier to a A. C. variation thereof, an A. C. amplifier for amplifying the output of the converter, a motor connected to be actuated by that portion of the A. C. amplifier output which is in phase with the converter, a potentiometer having an output adjustable by said motor and connected to the input of the D. C. amplifier to produce a null system, means for varying the voltage range of said potentiometer, and damping means for damping the oscillations of the circuit and including means for feeding a damping voltage to the output of the D. C. amplifier.

PAUL S. GOODWIN.

References Cited in the file of this patent

UNITED STATES PATENTS

| Number | Name | Date |
| --- | --- | --- |
| 2,300,742 | Harrison et al. | Nov. 3, 1942 |
| 2,376,513 | Shaffer | May 22, 1945 |
| 2,376,599 | Jones | May 22, 1945 |
| 2,385,447 | Jones | Sept. 25, 1945 |
| 2,423,540 | Wills | July 8, 1947 |
| 2,446,390 | Rath | Aug. 3, 1948 |
| 2,464,708 | Moseley | Mar. 15, 1949 |
| 2,481,485 | Stanton | Sept. 13, 1949 |
| 2,482,064 | Hornfeck | Sept. 13, 1949 |
| 2,484,367 | Wills et al. | Oct. 11, 1949 |
| 2,492,863 | Hays, Jr. | Dec. 27, 1949 |
| 2,547,105 | Williams | Apr. 3, 1951 |